United States Patent Office 3,501,550
Patented Mar. 17, 1970

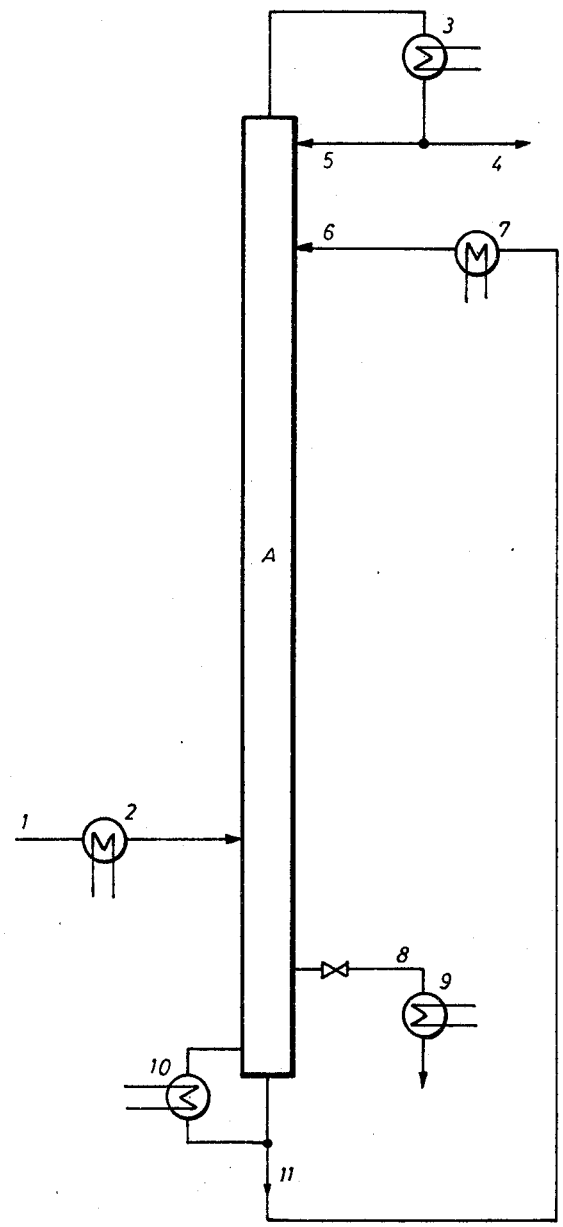

3,501,550
PROCESS FOR THE PRODUCTION OF PURE ISOPRENE BY EXTRACTIVE DISTILLATION OF CYCLOPENTADIENE WITH AQUEOUS ANILINE
Hans-Walther Brandt, Cologne-Flittard, Bruno Engelhard, Cologne-Stammheim, Walter Krönig, Leverkusen, and Wulf Schwerdtel, Cologne-Stammheim, Germany, assignors to Farbenfabriken Bayer Aktiengesellschaft, Leverkusen, Germany, a corporation of Germany
Filed Sept. 3, 1968, Ser. No. 756,976
Claims priority, application Germany, Sept. 6, 1967, F 53,423
Int. Cl. C07c 7/08, 11/18
U.S. Cl. 260—681.5
12 Claims

ABSTRACT OF THE DISCLOSURE

Extractive distillation with aniline, or aniline containing up to 5% water, of a crude isoprene containing $C_5$-diolefins, and optionally also $C_5$-mono-olefins, $C_6$-hydrocarbons and oxygen compounds, as main impurities, such crude isoprene being obtained by the reaction of i-butene and formaldehyde to form 4,4-dimethyl-m-dioxane followed by splitting of such dioxane to form crude isoprene as well as formaldehyde, whereby to produce an isoprene head product of at least about 99.5% purity.

---

This invention relates to a process for the production of pure isoprene.

It is known that isoprene can be produced from i-butene and formaldehyde. In the first stage of this process i-butene is reacted with formaldehyde to form 4,4-dimethyl-m-dioxane which is catalytically split up into isoprene and formaldehyde in a second stage.

There are several methods for producing the 4,4-dimethyl-m-dioxane. In one of these methods, e.g. as disclosed in copending U.S. application Ser. No. 705,459, filed Feb. 14, 1968, i-butene and an aqueous formaldehyde solution are reacted in the liquid phase in the presence of cation exchangers containing sulphonic acid suspended in the aqueous solution, at a temperature in the range of from 50° C. to 120° C. and at a pressure of from 20 to 30 atms. The reaction is carried out in a cascade of vessels, optionally incorporating several separators, in which the dioxane formed is separated from the aqueous formaldehyde containing solution. The unreacted $C_4$-hydrocarbons are separated as head product in a distillation column. The crude dioxane obtained as the tail product is used without further purification for the splitting.

The dioxane is split up in the gas phase in the presence of a fixed-bed catalyst or in a reactor containing a moving catalyst, for example, in a moving or a fluidized bed. In a preferred embodiment, splitting is carried out in a fluidized moving bed, at a temperature in the range of from 200 to 400° C., in which case phosphoric acid or an acid phosphate on a mechanically stable supporting material is used as the catalyst. Splitting is carried out in the presence of steam in a quantity of from 0.1 to 3 parts by weight per part by weight of dioxane.

The gaseous reaction products leaving the reactor are condenced by suitable measures, such as quenching, cooling or compression, and are transferred to a collecting vessel in which two layers are formed. The lower phase contains the formaldehyde formed in solution in water, whilst the upper phase consists of isoprene, i-butene and unreacted dioxane. From this upper phase the $C_5$-cut is isolated by distillation, for which purpose the i-butene is first of all removed overhead in a first column and the crude isoprene obtained as the tail product is freed of higher boiling components in a second column.

This crude isoprene has an isoprene content of from 90 to 99.5% by weight, and contains substantially the following impurities:

(a) $C_5$-diolefins (apart from isoprene itself): trans-1,3-pentadiene, cis-1,3-pentadiene and cyclopentadiene in a quantity of from 0.01 to 3.0% by weight, of which 0.001 to 1.0% by weight is cyclopentadiene.

(b) $C_5$-mono-olefins, above all 2-methyl-1-butene and 2-methyl-2-butene in a quantity of from 0.1 to 3.0% by weight.

(c) $C_6$-hydrocarbons, above all mono-olefins in a concentration range of from 0.5 to 5.0% by weight.

(d) oxygen compounds such as formaldehyde, methanol, methylal, tert.-butanol, di-tert.-butylether and 4,4-dimethyl-m-dioxane in a total quantity of from 0.05 to 5.0% by weight.

The pure isoprene is intended to have an isoprene content of at least 99.5% by weight, so that it may be polymerized in the conventional manner effectively. Maximum impurities in the following quantities are allowed for the purposes of polymerisation.

| Substance: | P.p.m. |
|---|---|
| Pentadiene (acyclic) | 100 |
| Cyclopentadiene | 5 |
| Oxygen compounds | 10 |

Basically, the different impurities listed above in the crude isoprene can be eliminated by several known separation processes carried out in succession. Thus, the oxygen compounds, formaldehyde in particular, can be removed by highly intensive washing with water. The $C_5$-diolefins can be separated from the isoprene by extractive distillation with known solvents such as, for example, N-methyl pyrrolidone or acetonitrile. Unfortunately, the removal of cyclopentadiene with these solvents involves prohibitive costs. Similarly, the $C_5$-mono-olefins can be removed by extraction, for example, with N-methyl pyrrolidone, whilst the $C_6$-hydrocarbons can be removed from isoprene by a highly separative distillation process.

It has now been found that pure isoprene can be obtained in a single step from a crude isoprene, obtained as a product in the reaction of i-butene and formaldehyde to form 4,4-dimethyl-m-dioxane, followed by spilliting of such dioxane to form isoprene and formaldehyde, containing as its main impurities $C_5$-diolefines and optionally also $C_5$-mono-olefins, $C_6$-hydrocarbons and oxygen compounds, e.g. in the aforesaid amounts in percent by weight (see (a) to (d) above), by a technically very simple process in which the crude isoprene is subjected to extractive distillation with aniline as the selective solvent.

The aniline takes up hydrocarbons, i.e., isoprene and the contaminants in a quantity of from 10 to 30% by weight and preferably in a quantity of 25% by weight. All the oxygen compounds, the $C_5$-diolefins and the $C_6$-hydrocarbons referred to above have much greater solubility coefficients in aniline than isoprene. Accordingly, all these impurities may be removed together in the lower part of the extraction column.

Removal of the cyclopentadiene is the key factor in the separation. All the other components are easier to remove, except of course for the residual p.p.m. contents noted above as required for providing a pure isoprene for polymerization.

Extractive distillation with aniline is also favourable for purifying of isoprene in cases where, apart from 1,3-pentadiene and cyclopentadiene, all impurities have been removed beforehand by other methods of purification, e.g. pentenes, $C_6$-hydrocarbons, oxygen compounds, and the like. In cases where other solvents are used, the pentadienes are considerably more expensive to remove. For example, in cases where N-methyl pyrrolidone is used to separate pentadienes, twice the reflux ratio is required, for the same number of trays, to lower the cyclopentadiene content in accordance with the above-specifid p.p.m. degree of purification.

Accordingly, it is possible by using aniline as the selective solvent to save a considerable amount of energy in removing the $C_5$-pentadienes that are present in conjunction with isoprene. At the same time, there is no need for intensive washing beforehand to remove the oxygen compounds present or to redistill the isoprene in order to remove higher boiling hydrocarbons therefrom.

In one particularly favourable embodiment of the extractive distillation with aniline, aqueous aniline is used, water contents of up to 5%, especially from 1 to 5% by weight based on the aniline present having proved to be favourable. It is possible by using the aqueous aniline solution to obtain an essentially complete reduction in the amount of polymers formed at the bottom of the column, because, when the aqueous aniline solution is used, the sump temperature can be lowered to 113° C., as against the temperature of 184° C. required when anhydrous aniline is used.

The extractive distillation is carried out at normal pressure or slightly increased pressure up to 2.0 atm., i.e. from normal pressure up to 2.0 atmospheres absolute. A bubble-tray column containing approximately 100 trays is preferably used. The crude isoprene to be used is preferably fed to the lower part of the column, at about the 30th tray, in vapour form. The column has a head temperature of 34°–50° C. The aniline required for extraction is run off from the sump of the column which has a temperature of from 113° C. to 200° C., depending upon the water content of the aniline. It is cooled through a condenser to the head temperature of the column of 34° C. when working at ordinary pressure, and is introduced in the form of a liquid at the top of the column just below the inlet for the recycled isoprene. The quantity in which the aniline is used is with advantage adjusted in such a way that the aniline is loaded with 10 to 30% by weight of the extracted materials. The impurities originally present in the crude isoprene are removed from the vapour phase through a lower sidestream (between the point at which the crude isoprene enters the column and the sump, i.e. at about the 10th tray). The aniline or aniline/water mixture, which leaves the sump of the column, is almost free of hydrocarbons and oxygen compounds. The pure isoprene flows off overhead and is pumped back to, or run off from, the head of the column corresponding to a reflux ratio of from 0.5:1 to 5:1 of the recycled portion to the run off head product in parts by weight.

The process according to the invention is illustrated in the following example:

EXAMPLE (a) The process according to the invention is described below with reference to the drawing. 600 cc. per hour of a crude isoprene obtained in accordance with (Example 1b) are introduced through a pipe 1 and an evaporator 2 in vapour form into a 100-plate distillation column A (operated at normal pressure) at the 30th plate. This crude isoprene has the following composition, i.e. based on the above-enumerated species of impurities (see (a) to (d) above).

| Substance: | Percent by weight |
|---|---|
| Isoprene | 98.165 |
| 1,3-pentadienes (cis- and trans-) | 0.030 |
| Cyclopentadiene | 0.005 |
| Pentenes | 0.400 |
| $C_6$-hydrocarbons | 0.700 |
| Oxygen compounds | 0.700 |

582 cc. per hour of the product accumulating at the head of the column in the condenser 3 are removed through a pipe 4, and 1164 cc. per hour are returned to the head of the column (100th plate) through a pipe 5. 2500 cc. per hour of aniline containing 2.5% by weight of water are introduced through a pipe 6 into the upper part of the column (at the 95th tray). The aniline/water mixture had been cooled beforehand to a temperature of 34° C. in the heat exchanger 7.

The impurities present in the isoprene were removed from the vapour phase in the lower half of the column (at the 10th plate) through a pipe 8 above the sump. 18 cc. per hour are condensed in the condenser 9.

The aniline/water mixture is heated in the evaporator 10 to boiling temperature (113° C.) and is thus regenerated through removal of all the dissolved components. The aniline/water mixture is returned to the column through a pipe 11 and the heat exchanger 7.

The pure isoprene accumulating at the head of the column has the following composition:

| Substance: | Percent by weight |
|---|---|
| Isoprene | 99.6014 |
| 1,3-pentadienes (cis- and trans-) | 0.0075 |
| Cyclopentadiene | 0.0001 |
| Pentenes (2-methyl-1- and 2-methyl-2-butene) | 0.3900 |
| $C_6$-hydrocarbons (mono-olefins) | 0.0005 |
| Oxygen compounds (formaldehyde, methanol, methylal, tert.-butanol, di-tert.-butyl ether and 4,4-dimethyl-m-dioxane) | 0.0005 |
| | 100.0000 |

The pure isoprene thus satisfies the polymerisation purity requirements.

The product run off in the sidestream from the 10th plate by way of the condenser 9 contains approximately 50% of isoprene in addition to a plurality of washed out impurities which in this mixture cannot be individually analysed.

(b) The crude isoprene used in Example 1(a) was obtained as follows:

A 37% aqueous formalin solution was reacted with i-butene, in the form of a $C_4$-cut containing 45.5% of i-butene, in a system of 6 agitation vessels at a temperature of from 110° C. to 115° C. and at a pressure of from 20 to 25 atms. An acid cation-exchanger based on polystyrene cross-linked with 2% by weight of divinyl benzene was used as the catalyst. This catalyst was used in a grain size of from 80 to 500$\mu$ and in a concentration of 30% by volume, based on the aqueous phase. After every second vessel there was a separator in which the aqueous formaldehyde solution was separated from the dioxane-containing hydrocarbon layer under full pressure. In a $C_4$-still such organic phase was separated into unreacted $C_4$-hydrocarbons as the head product and crude 4,4-dimethyl-m-dioxane as the sump product. Some of the head product of this column was recycled into the agitation vessel following the separation vessel. The aqueous phase was forced through the entire cascade. After the last separator, it was relieved of pressure, the catalyst was removed in a centrifugal separator and recycled into the first vessel, and the catalyst-free spent water was extracted with starting $C_4$-hydrocarbons in order to remove any dissolved reaction products. The effluent leaving the plant had a residual formaldehyde content of 0.4%, whilst the residual $C_4$-hydrocarbon mixture leaving the $C_4$-still had an i-butylene content of 17%. The following crude dioxane was obtained in the sump of the above-mentioned distillation column, i.e. $C_4$-still:

| Substance: | Percent by weight |
|---|---|
| 4,4-dimethyl-m-dioxane and similar products such as enols and dioxane alcohols | 84.9 |
| Tert.-butanol | 15.1 |
| | 100.0 |

This product was used without further purification in the catalytic splitting to form isoprene, formaldehyde and water. A fluidized bed was used for the splitting with the catalyst continuously circulating through a regenerator. With a residence time of one second, the crude dioxane sprayed in the form of a liquid into the lower part of the reactor was split up at a temperature of from 250° C. to 300° C. in the presence of 0.3 part by weight of steam per part by weight of crude dioxane. A spherical material of which 89% consisted of $SiO_2$ and 11% of $Al_2O_3$ was used as the catalyst. The catalyst had a grain size of from 1.5 to 2 mm. The catalyst left the reactor at its lower end and passed through a down pipe which was required as a barrier layer, whereupon it was conveyed pneumatically with steam, and thus flowed into the regenerator arranged above the reactor. In the regenerator, carbon was burnt off from the catalyst at a temperature of 650° C. The regenerated catalyst returned to the reactor, thus closing the circuit. The average residence time of the catalyst in the reactor was adjusted to 10 minutes.

The reaction products leaving the reactor were cooled to 70° C. by quenching with water and were then cooled further to 40° C. In a separator an approximately 20% formaldehyde solution was run off as the lower phase and recycled to the dioxane formation. The upper phase consisted of unreacted starting products and isoprene dissolved therein. Subsequent distillation removed unreacted dioxane, which was returned to the splitting reactor, from the dissolved isoprene fractions as head product.

The substances that were not condensed at the above-mentioned temperature of 40° C. (mostly i-butene and isoprene) were condensed by compression to 5 atms. followed by cooling to 20° C. and were then combined with the isoprene obtained as the head product in the aforementioned distillation column.

The i-butene formed was separated as the head product in a second column. Higher boiling fractions (polymers) were removed as the sump product in a third distillation column. The crude isoprene passing overhead was treated in the purification stage described in Example 1(a) by extractive distillation with aniline.

What is claimed is:

1. Process for the production of substantially pure isoprene from a crude isoprene, obtained by the reaction of i-butene and formaldehyde to form 4,4-dimethyl-m-dioxane followed by splitting of such dioxane to form such crude isoprene as well as formaldehyde, such crude isoprene containing as impurities $C_5$-diolefins, other than isoprene, which comprises subjecting such crude isoprene to extractive distillation with aniline as selective solvent and recovering pure isoprene as head product.

2. Process according to claim 1 wherein the crude isoprene is subjected to extractive distillation with aniline containing from about 1–5% by weight of water as the selective solvent.

3. Process according to claim 2 wherein a crude isoprene is used which contains cyclopentadiene, trans-1,3-pentadiene and cis-1,3-pentadiene in a total quantity of from about 0.01–3.0% by weight, the cyclopentadiene being present in a quantity of from about 0.001–1.0% by weight.

4. Process according to claim 2 wherein a crude isoprene is used which contains as its main impurities $C_5$-diolefins, $C_5$-mono-olefins, $C_6$-hydrocarbons and oxygen compounds.

5. Process according to claim 4 wherein a crude isoprene is used which contains as its main impurities from about 0.01–3.0% by weight $C_5$-diolefins, from about 0.1–3.0% by weight $C_5$-mono-olefins, from about 0.5–5.0% by weight $C_6$-hydrocarbons, and from about 0.05–5% by weight oxygen compounds.

6. Process according to claim 5 wherein a crude isoprene is used which contains as its main impurities cyclopentadiene, trans-1,3-pentadiene and cis-1,3-pentadiene in a total quantity of from about 0.01–3.0% by weight, the cyclopentadiene being present in a quantity of from about 0.001–1.0% by weight, 2-methyl-1-butene and 2-methyl-2-butene in a total quantity of from about 0.1–3.0% by weight, $C_6$-mono-olefin hydrocarbons in a total quantity of from about 0.5–5.0% by weight, and formaldehyde, methanol, methylal, tert.-butanol, di-tert.-butyl ether and 4,4-dimethyl-m-dioxane in a total quantity of from about 0.05–5.0% by weight.

7. Process according to claim 2 wherein the extractive distillation is carried out at a pressure from normal pressure up to 2.0 atm.

8. Process according to claim 2 wherein the extractive distillation is carried out with recycling of the purified isoprene head product in a ratio of from about 0.5–5:1 of the recycled portion to the total head product in parts by weight.

9. Process according to claim 2 wherein the extractive distillation is carried out at a head temperature of 34–50° C. and at a sump temperature of about 113–200° C. such that the pure isoprene head product contains at most about 100 p.p.m. of acyclic pentadienes, at most about 5 p.p.m. of cyclopentadiene and at most about 10 p.p.m. of said oxygen compounds, and a purity of at least about 99.5% by weight.

10. Process according to claim 1 wherein the extractive distillation is carried out at a pressure from normal pressure up to 2.0 atm.

11. Process according to claim 1 wherein the extractive distillation is carried out with recycling of the purified isoprene head product in a ratio of from about 0.5–5:1 of the recycled portion to the total head product in parts by weight.

12. Process according to claim 1 wherein the extractive distillation is carried out at a head temperature of 34–50° C. and at a sump temperature of about 113–200° C. such that the pure isoprene head product contains at most about 100 p.p.m. of acyclic pentadienes, at most about 5 p.p.m. of cyclopentadiene and at most about 10 p.p.m. of said oxygen compounds, and has a purity of at least about 99.5% by weight.

References Cited

UNITED STATES PATENTS

| | | | |
|---|---|---|---|
| 2,366,361 | 1/1945 | Semon et al. | 203—57 |
| 3,230,157 | 1/1966 | Hill et al. | 260—681.5 X |
| 3,284,339 | 11/1966 | Begley et al. | 260—681.5 X |

DELBERT E. GANTZ, Primary Examiner

G. E. SCHMITKONS, Assistant Examiner

U.S. Cl. X.R.

203—51, 53, 59; 260—681